J. R. MURLIN AND W. P. GARRETY.
APPARATUS FOR DETERMINING PROPORTIONS IN COMPOUNDS AND MIXTURES.
APPLICATION FILED FEB. 24, 1919.

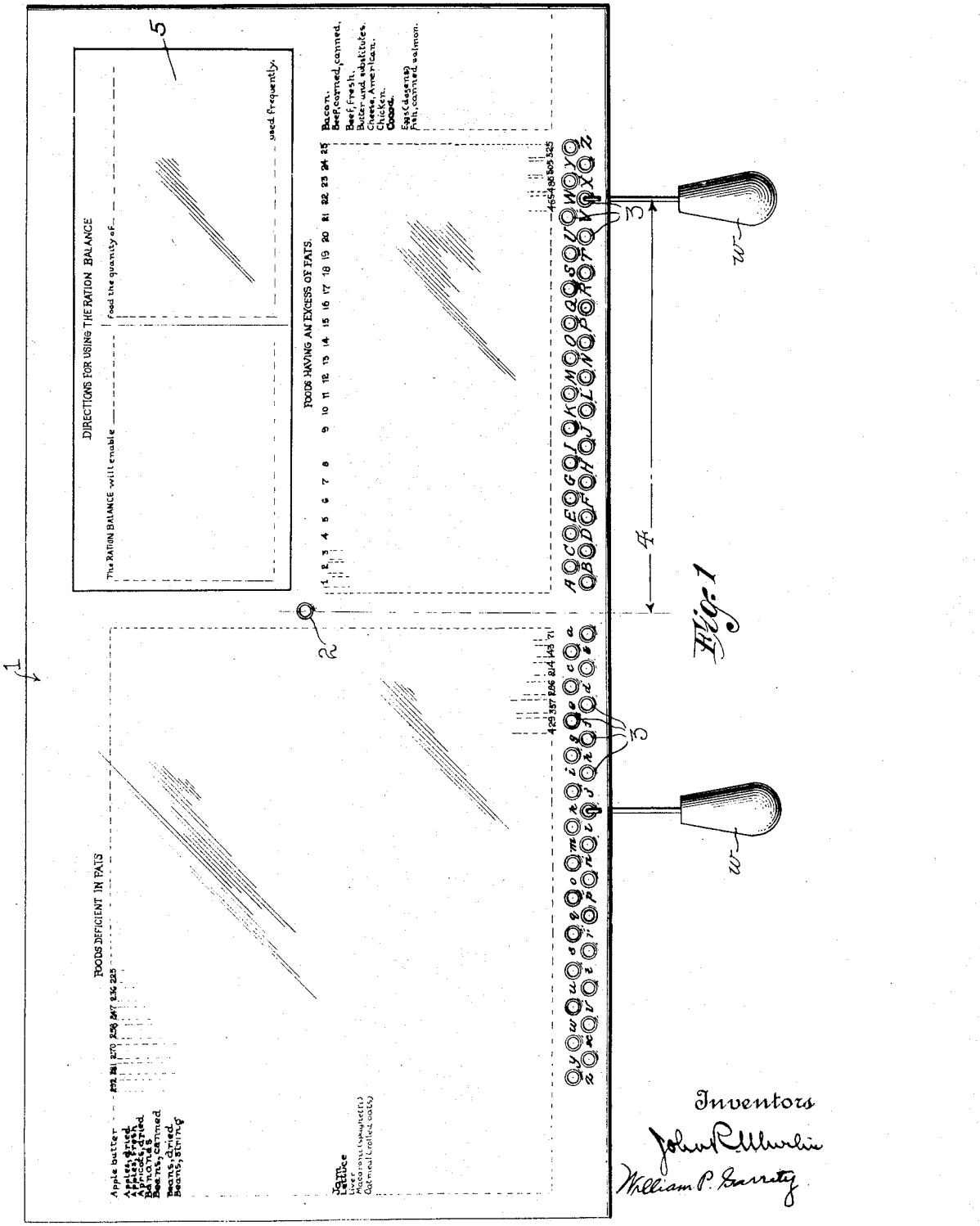

1,386,420.

Patented Aug. 2, 1921.

Fig. 2

| Food | Quantity | Weight in— | |
|---|---|---|---|
| Apples, dried | 19 pounds | e | 18 pour |
| Bacon | 25 pou | m | Two |
| Beef | 100 p | Z and G | 116 poun |
| Bread, soft | | B | |
| Coffee | | None | |
| Eggs | | K | |
| Marmalade | | b | |
| Milk, evaporated | | C | |
| Oatme | | C | |
| Onio | | None | |
| Pota | | | |
| Pru | | | |
| S | | | |

FOODS DEFIC

Apple butter — 159  152  146
Apple         94   90   86
App          464  446
Apr          176  169

Bacon         51   49
Bananas      591
Bread, hard
Breakfast foods
Butter and

Carrots.
Corn, canned
Corn, green

Fig. 3

Inventors

UNITED STATES PATENT OFFICE.

JOHN R. MURLIN AND WILLIAM P. GARRETY, OF THE UNITED STATES ARMY.

APPARATUS FOR DETERMINING PROPORTIONS IN COMPOUNDS AND MIXTURES.

1,386,420.   Specification of Letters Patent.   Patented Aug. 2, 1921.

Application filed February 24, 1919. Serial No. 279,006.

(FILED UNDER THE ACT OF MARCH 3, 1883, 22 STAT. L., 625.)

*To all whom it may concern:*

Be it known that we, JOHN R. MURLIN, Lt. Col., and WILLIAM P. GARRETY, Capt., of the United States Army, citizens of the United States, have invented an Improvement in Apparatus for Determining Proportions in Compounds and Mixtures, of which the following is a specification.

The invention described herein may be used by the Government, or any of its officers or employees in prosecution of work for the Government, or by any other person in the United States, without payment of any royalty thereon.

This invention relates to a new and useful apparatus for determining proportions in compounds and mixtures.

More particularly, our invention relates to a method of determining or indicating the proper proportion present in the mixture or compound of certain specified ingredients. The invention can be used, for example, for indicating whether any given meal composed of certain specified amounts of foods has those proportions of protein, fat, and carbo-hydrates that are most advantageous to proper nutrition. This embodiment of the invention has been found useful in camps, where large quantities of food are to be used, but by a proper design of the device for carrying out our invention, it may be found useful even for a small group of persons, such as the ordinary sized family.

The main object of our invention is, therefore, to provide a simple and inexpensive device capable of performing the functions stated above.

Another object is to provide a simple method of indicating the proper proportion of ingredients in any mixture, having given the amount and kinds of matters making up the mixture.

Other objects will become apparent as the description of the invention proceeds.

We will now describe in detail the apparatus we employ for the convenient application of our invention. The embodiment of our device is illustrated in the accompanying drawings, in which—

Figure 1 shows one side of the card which is used in our invention;

Fig. 2 shows an enlarged view of a portion of the reverse side of the card; and

Fig. 3 is a detail sectional view of the card showing the manner in which the apertures therein are bushed.

Referring now more in detail to the drawing in which like reference characters refer to corresponding parts throughout the figures, the card 1 is provided with a central aperture 2 that is lined with a thin brass bushing adapted to resist wear. This aperture is placed exactly at the center of gravity of the card so that when the card is suspended on a nail, the lower edge of the card will remain horizontal when placed in that position. Adjacent the bottom edge of the card a series of staggered apertures 3, similarly bushed, are provided. These apertures are adapted to support the small weights $w$, as shown in Fig. 1. The face of the card is filled up with vertical columns of numbers representing quantities of food. Each of the columns is directly over a corresponding aperture 3, so that when the small weight $w$ is hung in that aperture its center of gravity, when the card is horizontal, is on the center line of the column of numbers.

The numbers on the face of the card are also arranged in horizontal rows, each row corresponding to a certain kind of food. The front face of the card, which face is shown in Fig. 1, is used to determine the proportion of fat in the meal. The rows of numbers at the right of the card are utilized for foods having an excess of fats, and the space at the left of the card is utilized for foods deficient in fats. This arrangement, as is readily seen, might be reversed. At the upper right hand corner an oblong space 5 is provided in which directions for using the card may be printed. The apertures 3 at the bottom edge are indexed by letters as shown. Some foods, which it is advisable to use frequently, are printed in heavy type. The reverse side of the card is filled up with numbers corresponding to the front side, except that the foods are grouped with regard to deficiency or excess of protein. At the upper left hand corner of the reverse side an oblong space 6 is provided, giving an example of how the card is used.

The numbers on the same horizontal line represent the quantities of the corresponding food and indicate in which of the apertures 3 the small weight $w$ should be hung.

The horizontal distance between any particular number and the central aperture 2 is made proportional, first, to the weight of the particular food and, second, to the arithmetic difference between the desired percentage of energy of the food per pound and the actual number of fat calories per pound; or, in the case of protein, the desired percentage of the energy of the food per pound and the number of protein calories per pound. The numbers themselves might represent gallons, quarts, pints or dozens instead of pounds when such foods as milk or eggs are dealt with; but the foregoing law for the distance is computed with respect to the weight of these foods. Thus, if $r$ represents the desired percentage of calories per pound of the food and $s$ the number of fat calories per pound actually present in the food, and $W$ the weight of the food in pounds, the distance 4 in spaces from the center is equal to the expression $$d = \frac{W(r-s)}{k}$$

where $k$ is any desired constant, kept the same for all the foods on the same side of the card.

As a matter of convenience in constructing the card, the distances from the center 2 are chosen so that the interval between the apertures will be equal throughout and the corresponding weight $W$ of any food is calculated from the relation:

$$d = \frac{W(r-s)}{k};$$

that is—

$$W = \frac{dk}{r-s}.$$

In this way, a certain predetermined number of apertures 3 only need be used; twenty-six being shown for each side of the card.

Should it now be desired to ascertain whether a meal for a family or for a company of soldiers has the proper proportion by weight of fat, a small weight $w$ is hung in a certain aperture 3 for each of the kinds of food used. For example, if 50 pounds of dried peas are used, the first step is to find the horizontal row corresponding to dried peas. In this case, the horizontal row will be found on that side of the card corresponding with foods deficient in fats. The number 50 is then looked for on this horizontal row, and if not found, the closest number to 50 is chosen. The number 50, or the closest number thereto, will be located in a certain vertical column, and the weight $w$ is hung in the aperture adjacent the lower edge of the card corresponding to this vertical column. The same procedure is followed for each of the kinds of food. The numbers for those foods having an excess of fat will be found on the other side of the card, but the procedure for placing the weight $w$ will be the same as outlined above. If the quantity of food is greater than the largest number shown on the balance, two or more weights must be hung. No weight need be hung for any food the quantity of which is less than one-half the smallest quantity shown. Some foods (for example, string beans) contain so nearly the correct proportion of fat that weights need not be hung for them unless they are used in very large quantities. Small quantities of food not shown on the balance may be neglected; large quantities may be represented by a food of similar composition which is listed. If after all the weights are hung, the card balances, in a horizontal position, that is, if the lower edge remains horizontal, then the meal has the proper percentage of fat. If the card is tilted, however, it may be brought into a horizontal position by a proper adjustment of the weights of foods to be used or by the addition of another food.

To determine whether the given meal has the proper percentage of protein, the reverse side of the card is made use of. The same process, however, is gone through as described above for the front side of the card. If the card balances when all the weights are hung, then the meal has the proper percentage of protein. The remaining ingredient, carbo-hydrate, of the meal must then necessarily be in correct proportion, since the other two ingredients are in the correct proportion.

To demonstrate that the design of the card and its use will properly perform the desired functions, the following mathematical analysis is given;

Let $r$ represent the ratio desired of any ingredient, given as a decimal fraction.

Let A, B, C, . . . represent the weights of the kinds of matter present in the mixture.

Let $a, b, c, \ldots$ represent the ratio of the weight of the ingredient present in the various kinds of matter A, B, C. . . .

When the card balances with the small weights $w$ all hung in a horizontal position, then the following condition is fulfilled:

$$kA(a-r)w + kB(b-r)W + kC(c-r)w + kD(d-r)w + \ldots = 0.$$

This is an equation of turning moments about the center 2, (see Fig. 1). In this equation the expressions $(a-r)$, $(b-r)$, etc., etc., must retain their proper algebraic signs. Should any one of these parenthetical quantities have a plus sign, the kind of matter to which the quantity relates has an excess of the specified ingredient; should any one of them have a minus sign, then the matter to which it corresponds is deficient in the ingredient specified. The card takes care of such a difference in sign by having weights hung on opposite sides of the center.

This equation of moments can be simplified by dividing out the expression kw, and this results in the following:

$$(Aa-Ar)+(Bb-Br)+(Cc-Cr)+(Dd-Dr)+\ldots=0.$$

Further simplification gives:

$$Aa+Bb+Cc+Dd+\ldots = Ar+Br+Cr+Dr+\ldots$$

or $$Aa+Bb+Cc+Dd+\ldots = r(A+B+C+D+\ldots)$$

Dividing through:

$$\frac{Aa+Bb+Cc+Dd+\ldots}{A+B+C+D+\ldots}=r$$

This last expression is merely a statement in algebraic form that the mixture has the proper ratio $r$ of the specified ingredients. Therefore, if the turning moments equate to zero, then the mixture of A, B, C, D, ... has the proper percentage of the specified ingredients.

Now suppose that the turning moments corresponding to the kinds of matter having an excess of the ingredient is represented by:

$$T.M.=kA(a-r)w+kB(b-r)w+\ldots$$
$$=kw[Aa-Ar+Bb-Br+\ldots]$$
$$=kw[(Aa+Bb+\ldots)-(Ar+Br+\ldots)]$$

The expression in the square brackets is merely the actual excess, in pounds, of the ingredient the kinds of matter have, over what they should have. Therefore the total turning moment is proportional to the excess of the ingredient. In the same way, the turning moment corresponding to the kinds of matter deficient in the ingredient, is proportional to the deficiency of the ingredient.

It is to be understood that other arrangements of forces may be utilized for effecting the desired result. For example: Instead of using turning moments such as described, it is possible to use merely single forces representing, however, the same quantities as the turning moments have represented in the foregoing description. When these forces, applied in the proper direction along a straight line, balance, then the condition is fulfilled in the same way as when the turning moments are balanced.

Having now described our invention, what we claim as new and desire to secure by Letters Patent is:

1. In a device of the character described, a card provided with means for suspension at its center of gravity, said card having vertical rows of numbers corresponding to quantities of matter to be included in a mixture, and weights adapted to be suspended on said card; said numbers serving to locate the point of suspension of said weights.

2. In a device of the character described, a card adapted for suspension and provided with a series of numbers on both the front and reverse side, corresponding to the amounts of matter present in any mixture, weights adapted to be hung on the card, the location of said weights being indicated by the numbers on the card, said card having apertures adapted to be utilized when either the front or reverse side is used.

3. In a device of the character described, a card adapted for suspension at its center of gravity, having vertical columns of numbers, said numbers representing quantities of matter of a certain kind and arranged so that the distance between any number and the center of gravity of the card is proportional to the excess or deficiency in the kind of matter the number represents, of any specified ingredient.

JOHN R. MURLIN.
WILLIAM P. GARRETY.